United States Patent
Luo et al.

(10) Patent No.: US 12,517,978 B2
(45) Date of Patent: Jan. 6, 2026

(54) CURVATURE-BASED SIGNAL SEGMENTATION METHOD FOR SOLAR-BLIND ULTRAVIOLET PHOTODETECTORS

(71) Applicant: Chongqing University of Posts and Telecommunications, Chongqing (CN)

(72) Inventors: Jiufei Luo, Chongqing (CN); Wei Liu, Chongqing (CN); Sheng Lu, Chongqing (CN); Song Feng, Chongqing (CN); Haiqing Li, Chongqing (CN); Hai Zeng, Chongqing (CN); Hongcheng Li, Chongqing (CN); Xinyu Wang, Chongqing (CN); Baojun Yang, Chongqing (CN); Denghua Zheng, Chongqing (CN)

(73) Assignee: Chongqing University of Posts and Telecommunications, Chongqing (CN)

(*) Notice: Subject to any disclaimer, the term of this patent is extended or adjusted under 35 U.S.C. 154(b) by 0 days.

(21) Appl. No.: 19/031,258

(22) Filed: Jan. 17, 2025

(65) Prior Publication Data
US 2025/0165556 A1    May 22, 2025

Related U.S. Application Data

(63) Continuation of application No. PCT/CN2024/079977, filed on Mar. 4, 2024.

(30) Foreign Application Priority Data

Apr. 19, 2023 (CN) .......... 202310420159.8

(51) Int. Cl.
G06F 17/16 (2006.01)
G01J 1/42 (2006.01)
G06F 17/11 (2006.01)

(52) U.S. Cl.
CPC .............. *G06F 17/16* (2013.01); *G01J 1/429* (2013.01); *G06F 17/11* (2013.01)

(58) Field of Classification Search
CPC ................................ G01J 1/429; G06F 17/16
See application file for complete search history.

(56) References Cited

U.S. PATENT DOCUMENTS

| | | |
|---|---|---|
| 9,207,069 B2 | 12/2015 | Kitamura et al. |
| 2012/0256916 A1 | 10/2012 | Kitamura et al. |
| 2021/0112647 A1* | 4/2021 | Coleman ............ H05B 47/1985 |

FOREIGN PATENT DOCUMENTS

| | | |
|---|---|---|
| CN | 107845099 A | 3/2018 |
| CN | 109409437 A | 3/2019 |

(Continued)

*Primary Examiner* — Michael D. Yaary

(57) ABSTRACT

The present disclosure relates to a curvature-based signal segmentation method for solar-blind ultraviolet (UV) photodetectors, including the steps of: collecting solar-blind UV radiation using solar-blind UV photodetectors according to a preset sampling time and generating the same into sampled signals; performing noise reduction on the sampled signals to generate filtered signals using a fractional calculus digital filter; calculating estimated curvatures of the filtered signals using a method of circle fitting by discrete points, and numerically optimizing the estimated curvatures using an exponential function to obtain curvature vectors of the filtered signals; and calculating weight coefficients and weighting the filtered signals using a moving average filter function and a binarization method according to the curvature vectors.

9 Claims, 3 Drawing Sheets

(56) References Cited

FOREIGN PATENT DOCUMENTS

| | | | |
|---|---|---|---|
| CN | 115953413 | A | 4/2023 |
| EP | 2645329 | A1 | 10/2013 |

* cited by examiner

CURVATURE-BASED SIGNAL SEGMENTATION METHOD FOR SOLAR-BLIND ULTRAVIOLET PHOTODETECTORS

CROSS-REFERENCE TO RELATED APPLICATIONS

This application is a continuation of PCT/CN2024/079977, filed on Mar. 4, 2024 and claims priority of Chinese Patent Application No. 202310420159.8, filed on Apr. 19, 2023, the entire contents of which are incorporated herein by reference.

TECHNICAL FIELD

The present disclosure belongs to the technical field of signal segmentation, and specifically relates to a curvature-based signal segmentation method for solar-blind ultraviolet (UV) photodetectors.

BACKGROUND

Solar-blind UV photodetector is an instrument to receive and detect UV radiation with a wavelength less than 280 nm. With a higher detection sensitivity and anti-radiation performance, it is widely applied in military and civilian fields such as missile guidance, secure space communication, ozonesphere hole monitoring, and flame detection. However, influenced by a long transmission distance and the presence of persistent photoconductivity, the output signals collected by the detector tend to be weak and susceptible to noise, and the frequency response of the signals fails to present an ideal high and low level state due to the presence of attenuation periods, resulting in a reduced accuracy and transmission rate in decoding the information transmitted by the signals at the receiving terminal, failing to intuitively reflect the characteristics of solar-blind UV radiation through the signals. Therefore, to facilitate decoding at the receiving terminal, the received signals from solar-blind UV photodetectors require to be processed, so as to improve signal transmission rate and accuracy.

For the I-t characteristic curve collected by the solar-blind UV photodetector, to complete signal decoding, the sampled signal needs to be first denoised, then segmented, and finally rectified. Noise reduction is a prerequisite for signal segmentation, and signal segmentation serves for finding reasonable and accurate segmentation points to achieve signal rectification. As an effective signal analysis method, signal segmentation is currently commonly applied in fields such as surface electromyogram signals, heart sound signals, and speech periodic signals. However, there is a lack of effective signal segmentation strategies designed for the weaker signals from solar-blind UV photodetectors.

SUMMARY

To solve the problem existing in the above background, the present disclosure provides a curvature-based signal segmentation method for solar-blind UV photodetectors. This method involves that after implementing noise reduction using a fractional calculus digital filter, a discrete curvature calculation method is employed to determine segment boundary points, completing signal segmentation and rectification, thereby achieving signal decoding. This algorithm is capable of extracting effective information of signals from solar-blind UV photodetectors for analysis while reducing noise, enhancing the signal transmission rate and accuracy. The specific technical solutions are described as follows.

A curvature-based signal segmentation method for solar-blind UV photodetectors includes the following steps:

S1: collecting solar-blind UV radiation using solar-blind UV photodetectors according to a preset sampling time and generating the same into sampled signals;

S2: performing noise reduction on the sampled signals to generate filtered signals using a fractional calculus digital filter;

S3: calculating estimated curvatures of the filtered signals using a method of circle fitting by discrete points, and numerically optimizing the estimated curvatures using an exponential function to obtain curvature vectors of the filtered signals;

S4: weighting the filtered signals using a moving average filter function and a binarization method according to the curvature vectors of the filtered signals, to obtain a plurality of non-zero discrete time-domain segments; and excluding interference segments from each non-zero discrete time-domain segment based on a mean value and width thereof, to obtain candidate segmentation point signals; and S5: setting determination indicators according to the candidate segmentation point signals to determine upper and lower segment boundary points, and segmenting and rectifying the filtered signals by means of the upper and lower segment boundary points to obtain signals from solar-blind UV photodetectors.

Further, step S3 includes:

S31: defining the filtered signal $S=\{S_0, S_1, \ldots, S_{n-1}\}$, where n is a length of the filtered signal, and framing the filtered signal according to a preset frame length w and a frame shift r to obtain $S=\{SW_0, SW_1, \ldots, SW_i, \ldots, SW_{(n-w-1)r}\}$, where $SW_i$ represents an $i_{th}$ frame signal of the filtered signal, and (n−w−1)r represents the number of frames in the filtered signal;

S32: dividing, by means of a midpoint of the length $M=<w/2>$, the $i_{th}$ frame signal $SW_i=\{SW_{i1}, SW_{i2}, \ldots, SW_{i<w/2>}, \ldots, SW_{iw}\}$ of the filtered signal into left and right segmented frames $\{SW_{i1}, SW_{i2}, \ldots, SW_{i[<w/2>-1]}\}$ and $\{SW_{i[<w/2>+1]}, \ldots, SW_{iw}\}$, where $<>$ represents rounding down; and counting mid-values of signals of the left and right segmented frames, denoted as $S_{iR}$ and $S_{iL}$, respectively, and taking $(S_{iR}, M/2)=(x_1, y_1)$, $(S_{iM}, M)=(x_2, y_2)$, and $(S_{iL}, 3M/2)=(x_3, y_3)$ as three discrete points for the $i_{th}$ frame signal;

S33: constructing, based on a circle expansion formula $x^2+y^2+ax+by+c=0$, an error equation $W_{1i}=\Sigma_{j=1}^{3}(x_j^2+y_j^2+ax_j+by_j+c)^2$ for a circle of the $i_{th}$ frame signal and a position error equation $W_{2i}=\Sigma_{j=1}^{3}(y_j-(dx_j+e))^2$ for a straight line and a center of the circle using the three discrete points $(x_j, y_j)$ (j=1, 2, 3) of the $i_{th}$ frame signal of the filtered signal; and calculating partial derivatives 0 for the unknown parameters a, b, c, d, and e to obtain approximate estimated values $\hat{a}_i$, $\hat{b}_i$, $\hat{c}_i$, $\hat{d}_i$, and $\hat{d}_i$ for this frame signal;

S34: constructing a fitting circle based on $\hat{e}_i$, $\hat{a}_i$, $\hat{b}_i$, $\hat{c}_i$, $\hat{d}_i$, and $\hat{e}_i$, calculating an estimated curvature for the $i_{th}$ frame signal of the filtered signal:

$$\hat{p}_i = (-1)^{\tau_i} / \left[ (\hat{a}_i^2 + \hat{b}_i^2 - 4\hat{c}_i^2)/2 \right]^{1/2}$$

$$\tau_i = [\text{sign}(\hat{a}_i \hat{a}_i + \hat{e}_i - \hat{b}_i) + 1]/2$$

where $\hat{p}_i$ represents the estimated curvature for the $i_{th}$ frame signal of the filtered signal, $\tau_i$ is a parameter reflecting the bending direction of a curve of the $i_{th}$ frame signal, and sign(•) represents a sign function; and selecting a frame shift r=1, and obtaining an estimated curvature sequence $\rho = \{\rho_0, \rho_1, \ldots, \rho_{n-1}\}$ of the filtered signal through periodic extension; and S35: extracting the maximum element $\rho_{max}$ from the estimated curvature sequence $\rho$ of the filtered signal, normalizing the estimated curvature of the filtered signal according to $\rho_{max}$, i.e., $\bar{\rho}_i = \rho_i / \rho_{max}$, and i= $\{0, 1, \ldots, n-1\}$; and using the normalized $\bar{\rho}_i$ as an input variable x for the exponential function $R(x) = 10^x$ to obtain the numerically optimized curvature vector $R = \{R_0, R_1, \ldots, R_{n-1}\}$.

Further, step S4 includes:

S41: smoothing the curvature vector R using the moving average filter function, setting a threshold $\theta = A \times \max(R)$ to traverse each element in the smoothed result, and setting weights of elements greater than the threshold $\theta$ as 1 and weights of elements less than or equal to the threshold $\theta$ as 0, to generate a weight coefficient vector $\phi = [\phi_0, \phi_1, \ldots, \phi_{n-1}]$ corresponding to the smoothed result;

S42: weighing the filtered signal according to the weight coefficient vector $\phi$, i.e., $Q = S \times \phi$, to obtain the plurality of non-zero discrete time-domain segments; and S43: extracting the mean value and width of each non-zero discrete time-domain segment sequentially, discarding the non-zero discrete time-domain segment if the mean value thereof is less than 30% of the threshold $\theta$ and the width is below 150, and otherwise, retaining the non-zero discrete time-domain segment, to obtain the candidate segmentation point signal.

Further, A is an adjustable parameter, ranging from 0.1-0.3.

Further, the setting determination indicators according to the candidate segmentation point signal to determine upper and lower segment boundary points includes:

determining the lower segment boundary point according to the candidate segmentation point signal by setting the determination indicator, segmenting the filtered signal using the lower segment boundary point, estimating the curvature vector for each segment of signal using the method of circle fitting by discrete points, and finally taking a horizontal coordinate corresponding to the maximum curvature as the upper segment boundary point.

Further, the determining the lower segment boundary point according to the candidate segmentation point signal by setting the determination indicator includes:

S51: extracting horizontal coordinates corresponding to the maximum values in various non-zero discrete time-domain segments of the candidate segmentation point signal to form a one-dimensional vector $\zeta = \{\zeta_0, \zeta_1, \ldots, \zeta_k, \ldots, \zeta_{K-1}\}$, where K represents the number of non-zero discrete time-domain segments in the candidate segmentation point signal, performing a first-order forward difference operation on the one-dimensional vector $\zeta = \{\zeta_0, \zeta_1, \ldots, \zeta_k, \ldots, \zeta_{K-1}\}$, and calculating a mean value to obtain a neighborhood width $\gamma$ used for determination of segment boundary points;

S52: taking a horizontal coordinate $\zeta_k$ corresponding to the maximum value in each non-zero discrete time-domain segment as a center point, and intercepting sample data $R_{\zeta_k} = \{R_{\zeta_{k-<\lambda/2>}}, \ldots, R_{\zeta_k}, \ldots, R_{\zeta_{k+<\lambda/2>}}\}$ with a length $\gamma$ on left and right, and calculating determination indicators $\Delta_{RE} = N_{RE}/\lambda$ and $\Delta_{LE} = N_{LE}/\lambda$, where $N_{RE}$ and $N_{LE}$ represent the number of sample points less than $R_{\zeta_k}$ in the left and right data of $\zeta_k$;

S53: dividing $R_{\zeta_k}$ into two segmented data $\{R_{\zeta_{k-<\lambda/2>}}, \ldots, R_{\zeta_k}\}$ and $\{R_{\zeta_{k+1}}, \ldots, R_{\zeta_{k+<\lambda/2>}}\}$ with the sample data $R_{\zeta_k}$ as a center; counting mid-values $R_{\zeta_{kR}}$ and $R_{\zeta_{kL}}$ of the left and right segmented data, respectively, taking three points $(R_{\zeta_{kR}}, \zeta_{k-<\lambda/2>})$, $(R_{\zeta_k}, \zeta_k)$, and $(R_{\zeta_{kL}}, \zeta_{k+<\lambda/2>})$ as discrete points of the sample data $R_{\zeta_k}$ to construct a straight line $Y_{\zeta_k}$, and calculating an energy difference $E_{\zeta_k}$ between the straight line $Y_{\zeta_k}$ and the sample data $R_{\zeta_k}$; and S54: setting a parameter t, determining $\zeta_k$ as the lower segment boundary point in a case that both the determination indicators $\Delta_{RE}$ and $\Delta_{LE}$ are less than t, directly excluding $\zeta_k$ in a case that $\Delta_{RE} \geq t$; and requiring to determine the determination indicator $E_{\zeta_k}$ in a case that $\Delta_{RE} < t$ and $\Delta_{LE} \geq t$, and determining $\zeta_k$ as the lower segment boundary point in a case that $E_{\zeta_k} \geq 0.5$.

Further, the energy difference is calculated by the formula $$E_{\zeta_k} = |R_{\zeta_k} - Y_{\zeta_k}|_2^2,$$

where $|\cdot|_2$ represents a 2-norm of the vector.

Further, the parameter t is an adjustable parameter, ranging from 0.1-0.3.

Further, the segmenting and rectifying the filtered signal includes: rectifying the signal through the upper and lower segment boundary points, setting all filtered signal data from the lower segment boundary point to the first upper segment boundary point on the left as 0, and setting all the data from the lower segment boundary point to the first upper segment boundary point on the right as 1 according to the characteristics of the filtered signal, with each lower segment boundary point as a center, and completing the automatic rectification of the filtered signal.

The present disclosure has at least the following beneficial effects.

1. This algorithm achieves curvature-based noise reduction, segmentation, and rectification of weaker signals from solar-blind UV photodetectors. In a case that the original sampled signals fail to be recognized, this algorithm allows for the characterization of the specific information carried by the weaker signals, ensuring the accuracy of the signals from solar-blind UV photodetectors.

2. In the present disclosure, the signals from solar-blind UV photodetectors can be quickly and accurately segmented into signal segments with different physical characteristics, facilitating subsequent analysis of characteristics such as frequency response, quantum efficiency, and responsivity.

3. This algorithm has good algorithm portability and robustness, which can segment and rectify various signals from solar-blind UV photodetectors, improving signal transmission rate. In addition, this algorithm has a higher precision and lower computational complexity.

DETAILED DESCRIPTION

Figure 1:
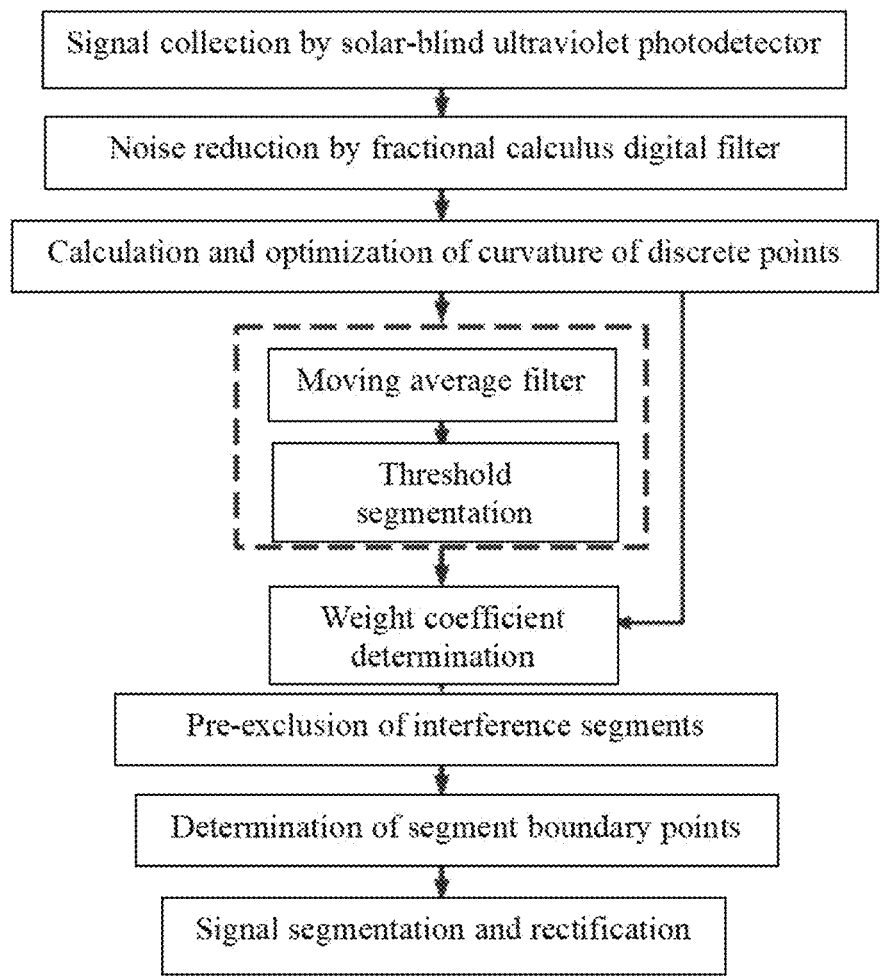
FIG. 1 is a flow chart of a method according to the present disclosure.

The embodiments of the present disclosure are described by means of particular specific examples below, and other advantages and effects of the present disclosure can be readily understood by those skilled in the art from the contents disclosed in the specification. The present disclosure may also be implemented or applied in different specific embodiments, and the details in the specification may be modified or altered in various ways based on different viewpoints and applications without departing from the spirit of the present disclosure. It is to be noted that the illustrations provided in the following examples are solely intended to schematically explain the basic concept of the present disclosure. The following examples and features thereof may be combined with each other without conflict.

The accompanying drawings are solely for illustrative purposes, representing schematic diagrams rather than physical images, and are not to be construed as limiting the present disclosure. To better illustrate the examples of the present disclosure, some components in the drawings may be omitted, enlarged, or reduced in size, and do not represent the actual dimensions of the product. For those skilled in the art, it is understandable that some well-known structures and descriptions thereof in the drawings may be omitted.

In the accompanying drawings of the examples of the present disclosure, the identical or similar labels correspond to the identical or similar components. In the description of the present disclosure, it is to be understood that, the orientation or state relations indicated by the terms "up", "down", "left", "right", "front", "rear", etc., are based on those shown in the accompanying drawings and merely for the ease of describing the present disclosure and simplifying the description, rather than indicating or implying that the device or element referred to must be in a specific orientation or constructed and operated in a specific orientation, and therefore cannot be interpreted as limiting the present disclosure. For those of ordinary skill in the art, the specific meaning of the above terms may be understood according to specific circumstances.

As shown in FIG. 1, the present disclosure provides a curvature-based segmentation method for solar-blind UV photodetectors, including the following steps.

S1: solar-blind UV radiation is collected using solar-blind UV photodetectors according to a preset sampling time, and the same is generated into sampled signals.

Figure 2:
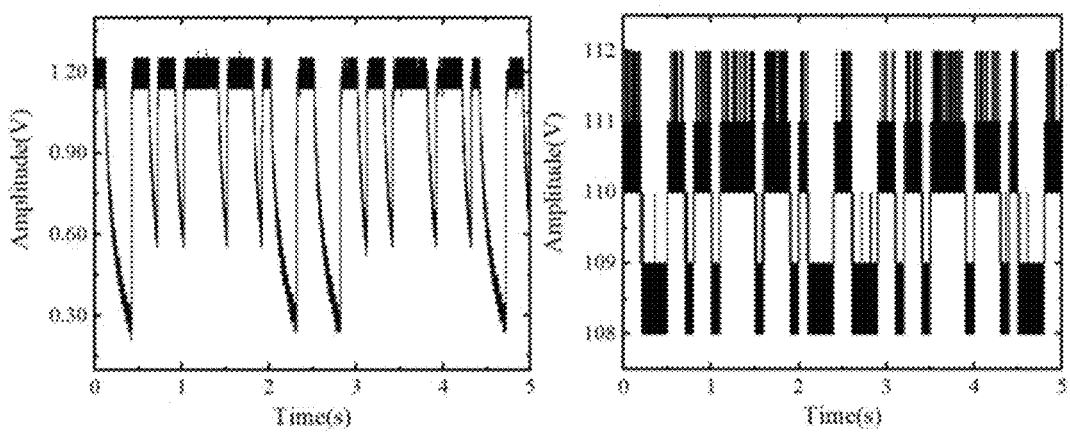
FIG. 2 shows two sets of original sampled signals collected by a solar-blind UV photodetector.

In an example, two sets of data are collected using the solar-blind UV photodetector, with a sampling frequency of fs=200000, a sampling time of 5 s, and a signal length of n=10000000. The time response of the detector under two sets of different wavelengths of light is shown in FIG. 2. It can be seen that the sampled signal contains a lot of noise, seriously affecting the analysis of characteristics.

S2: noise reduction is performed on the sampled signals to generate filtered signals using a fractional calculus digital filter.

In an example, to extract signal segmentation points, a differential order of 0.9 is set, and a fractional calculus digital lowpass filter is employed to perform noise reduction on the sampled signals. The results are shown in Table 3. It can be seen that the signal to noise ratio is improved effectively after filtering.

S3: estimated curvatures of the filtered signals are calculated using a method of circle fitting by discrete points, and the estimated curvatures are numerically optimized using an exponential function to obtain curvature vectors of the filtered signals.

In an example, to realize signal segmentation, the method of circle fitting by discrete points is employed to determine the estimated curvatures, which are numerically optimized. The specific calculation steps are as follows.

S31: the filtered signal is defined as $S=\{S_0, S_1, \ldots, S_{n-1}\}$, where n is a length of the filtered signal, and the filtered signal is framed according to a preset frame length w and a frame shift r to obtain $\bar{S}=\{SW_0, SW_1, \ldots, SW_i, \ldots, SW_{(n-w-1)r}\}$, where $SW_i$ represents an $i_{th}$ frame signal of the filtered signal, and (n−w−1)r represents the number of frames in the filtered signal. In some examples, w=1500.

S32: by means of a midpoint of the length M=<w/2>, the $i_{th}$ frame signal $SW_i=\{SW_{i1}, SW_{i2}, \ldots, SW_{i<w/2>}, \ldots, SW_{iw}\}$ of the filtered signal is divided into left and right segmented frames $\{SW_{i1}, SW_{i2}, \ldots, SW_{i[<w/2>-1]}\}$ and $\{SW_{i[<w/2>+1]}, \ldots, SW_{iw}\}$, where < > represents rounding down. Mid-values of signals of the left and right segmented frames are counted, denoted as $S_{iR}$ and $S_{iL}$, respectively. $(S_{iR}, M/2)=(x_1, y_1)$, $(S_{iM}, M)=(x_2, y_2)$, and $(S_{iL}, 3M/2)=(x_3, y_3)$ are taken as three discrete points for the $i_{th}$ frame signal, and a straight line is constructed based on the three discrete points.

S33: based on a circle expansion formula $x^2+y^2+ax+by+c=0$, an error equation $$W_{1i} = \sum_{j=1}^{3}(x_j^2 + y_j^2 + ax_j + by_j + c)^2$$

for a circle of the $i_{th}$ frame signal and a position error equation $$W_{2i} = \sum_{j=1}^{3}(y_j - (dx_j + e))^2$$

for the straight line and a center of the circle are constructed using the three discrete points $(x_j, y_j)$ (j=1, 2, 3) of the $i_{th}$ frame signal of the filtered signal. Partial derivatives 0 are calculated for the unknown parameters a, b, c, d, and e to obtain approximate estimated values $\hat{a}_i$, $\hat{b}_i$, $\hat{c}_i$, $\hat{d}_i$, and $\hat{e}_i$ for this frame signal.

Preferably, the estimation formulas for $\hat{a}_i$, $\hat{b}_i$, $\hat{c}_i$, $\hat{d}_i$, and $\hat{e}_i$ are as follows.

$$\hat{a} = \frac{(3H - DE)[3J + 3K - E(F + G)] - [3I + 3P - D(F + G)](3G - E^2)}{(3F - D^2)(3G - E^2) - (3H - DE)^2}$$

-continued $$\hat{b} = \frac{(3H - DE)[3I + 3P - D(F + G)] - (3F - D^2)[3J + 3K - E(F + G)]}{(3F - D^2)(3G - E^2) - (3H - DE)^2}$$

$$\hat{c} = \frac{\hat{a}D - \hat{b}E + F + G}{3}$$

$$\hat{d} = \frac{3H - DE}{3F - D^2}$$

$$\hat{e} = \frac{FE - DH}{3F - D^2}$$

$$D = \sum_{j=1}^{3} x_j,$$

$$E = \sum_{j=1}^{3} y_j,$$

$$F = \sum_{j=1}^{3} x_j^2,$$

$$G = \sum_{j=1}^{3} y_j^2,$$

$$H = \sum_{j=1}^{3} x_j y_j,$$

$$I = \sum_{j=1}^{3} x_j^3,$$

$$K = \sum_{j=1}^{3} x_j^2 y_j,$$

$$P = \sum_{j=1}^{3} x_j y_j^2$$

S34: a fitting circle is constructed based on $\hat{a}_i$, $\hat{b}_i$, $\hat{c}_i$, $\hat{d}_i$, and $\hat{e}_i$, and an estimated curvature is calculated for the $i_{th}$ frame signal of the filtered signal:

$$\hat{p}_i = (-1)^{\tau_i} / \left[ \left( \hat{a}_i^2 + \hat{b}_i^2 - 4\hat{c}_i^2 \right) / 2 \right]^{1/2}$$

$$\tau_i = [\text{sign}(\hat{a}_i \hat{d}_i + \hat{e}_i - \hat{b}_i) + 1]/2$$

where $\hat{p}_i$ represents the estimated curvature for the $i_{th}$ frame signal of the filtered signal, $\tau_i$ is a parameter reflecting the bending direction of a curve of the $i_{th}$ frame signal, and sign(•) represents a sign function. A frame shift r=1 is selected, and an estimated curvature sequence $\rho = \{\rho_0, \rho_1, \ldots, \rho_{n-1}\}$ of the filtered signal is obtained through periodic extension.

Figure 4:
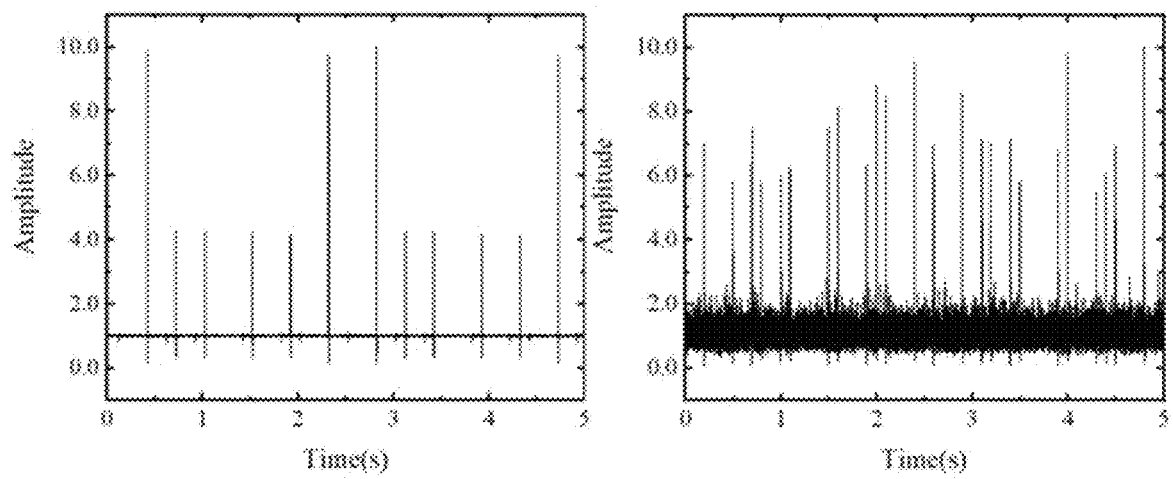
FIG. 4 shows a curvature vector obtained using a discrete curvature estimation method and numerical optimization.

Referring to FIG. 4, S35: the maximum element $\rho_{max}$ is extracted from the estimated curvature sequence $\rho$ of the filtered signal, the estimated curvature of the filtered signal is normalized according to $\rho_{max}$, i.e., $\overline{\rho}_i / \rho_{max}$, and i= {0, 1, ..., n−1}; and the normalized $\overline{\rho}_i$ is used as an input variable x for the exponential function R(x)=$10^x$ to obtain the numerically optimized curvature vector R={$R_0$, $R_1$, ..., $R_{n-1}$}. It can be seen that the value of the lower segment boundary point is larger, so that the lower segment boundary point can be extracted firstly to complete signal segmentation, and then the upper segment boundary point is determined.

S4: according to the curvature vectors of the filtered signals, the filtered signals are weighted using a moving average filter function and a binarization method, to obtain a plurality of non-zero discrete time-domain segments. Interference segments are excluded from each non-zero discrete time-domain segment based on a mean value and width thereof, to obtain candidate segmentation point signals.

In an example, by setting a reasonable threshold to generate a weighting coefficient, the filtered signal is weighted to obtain a plurality of non-zero discrete time-domain segments containing interference and segment boundary points. To reduce the burden on the subsequent determination of segment boundary points, the interference can be excluded by extracting the mean value and width of each weighted segment. The specific steps are shown as follows.

S41: the curvature vector R is smoothed using the moving average filter function, and a threshold θ=A×max(R) is set to traverse each element in the smoothed result. Weights of elements greater than the threshold θ are set as 1 and weights of elements less than or equal to the threshold θ are set as 0, to generate a weight coefficient vector $\phi = [\phi_0, \phi_1, \ldots, \phi_{n-1}]$ corresponding to the smoothed result.

Preferably, the parameter A is an adjustable parameter, ranging from 0.1-0.3. In this example, A=0.2.

S42: the filtered signal is weighted according to the weight coefficient vector $\phi$, i.e., Q=S×$\phi$, to obtain the plurality of non-zero discrete time-domain segments.

S43: the mean value and width of each non-zero discrete time-domain segment are extracted sequentially. The non-zero discrete time-domain segment is discarded if the mean value thereof is less than 30% of the threshold θ and the width is below 150, and otherwise, the non-zero discrete time-domain segment is retained.

S5: determination indicators are set according to the candidate segmentation point signal to determine upper and lower segment boundary points, and the filtered signal is segmented and rectified by means of the upper and lower segment boundary points to obtain signals from solar-blind UV photodetectors.

Preferably, setting determination indicators according to the candidate segmentation point signal to determine upper and lower segment boundary points includes that:

the lower segment boundary point is determined according to the candidate segmentation point signal by setting the determination indicator, the filtered signal is segmented using the lower segment boundary point, the curvature vector for each segment of signal is estimated using the method of circle fitting by discrete points, and finally a horizontal coordinate corresponding to the maximum curvature is taken as the upper segment boundary point.

In an example, through the pre-exclusion of the interference segment described in step S43, an inflection point interval containing both upper and lower segment boundary points can be obtained. Since some upper segment boundary points may be lost during the weighting of the filtered signal and larger non-boundary points may still exist in the numerical optimization results, in the algorithm, determination indicators are selected to exclude the upper segment boundary points and interference segments, while simultaneously recording all lower segment boundary points. Based on this, after segmenting the filtered signal using the lower segment boundary point, the discrete curvature estimation method is further utilized to determine the upper segment boundary point, thereby achieving signal rectification. The above content includes the following specific steps.

S51: horizontal coordinates corresponding to the maximum values in various non-zero discrete time-domain segments of the candidate segmentation point signals are extracted to form a one-dimensional vector $\zeta = \{\zeta_0, \zeta_1, \ldots, \zeta_k, \ldots, \zeta_{K-1}\}$, where K represents the number of non-zero discrete time-domain segments in the candidate segmentation point signal. A first-order forward difference operation is performed on the one-dimensional vector $\zeta=\{\zeta_0, \zeta_1, \ldots \zeta_k, \ldots, \zeta_{K-1}\}$, and a mean value is calculated to obtain a neighborhood width $\gamma$ used for determination of segment boundary points.

Figure 3:
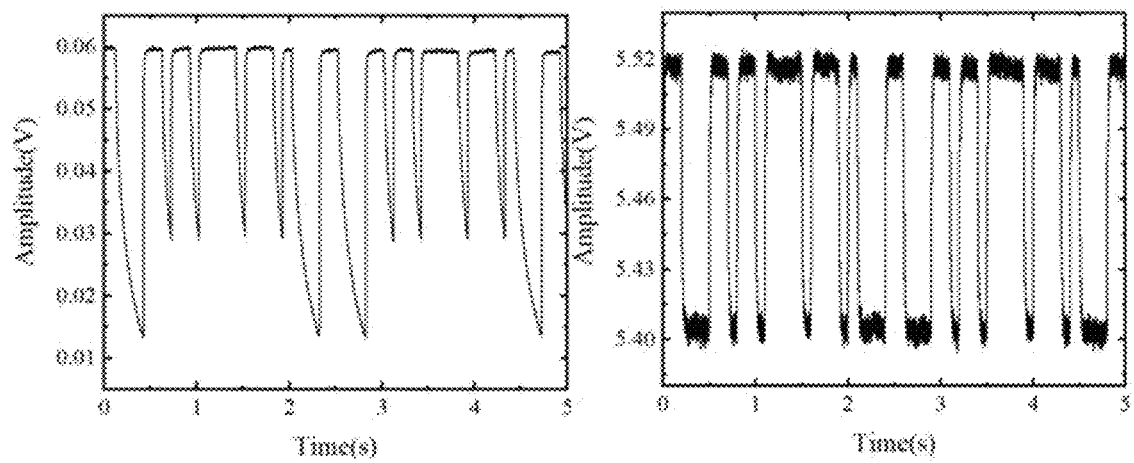
FIG. 3 shows filtered signals obtained using a fractional calculus digital filter.

S52: according to the waveform characteristics of the signal shown in FIG. 3, the lower segment boundary point is typically located at the trough or at the initial position of the rising edge of the signal. Therefore, the number of sample points below $R_{\zeta_k}$ within the neighborhood width $\gamma$ can be used as the determination indicator to exclude the pseudo lower segment boundary points. Specifically, taking a horizontal coordinate $\zeta_k$ corresponding to the maximum value in each non-zero discrete time-domain segment as a center point, sample data $R_{\zeta_k}=\{R_{\zeta_{k-<\lambda/2>}}\}$ with a length $\gamma$ is intercepted from left and right, and determination indicators $\Delta_{RE}=N_{RE}/\lambda$ and $\Delta_{LE}=N_{LE}/\lambda$ are calculated, where $N_{RE}$ and $N_{LE}$ represent the number of sample points less than $R_{\zeta_k}$ in the left and right data of $\zeta_k$.

S53: $R_{\zeta_k}$ is divided into two segmented data $\{R_{\zeta_{k-<\lambda/2>}}, \ldots, R_{\zeta_k}\}$ and $\{R_{\zeta_{k+1}}, \ldots, R_{\zeta_{k+<\lambda/2>}}\}$ with the sample data $R_{\zeta_k}$ as a center. Mid-values $R_{\zeta_{kR}}$ and $R_{\zeta_{kL}}$ of the left and right segmented data are counted, respectively. Taking three points $(R_{\zeta_{kR}}, \zeta_{k-<\lambda/2>})$, $(R_{\zeta_k}, \zeta_k)$, and $(R_{\zeta_{kL}}, \zeta_{k+<\lambda/2>})$ as discrete points of the sample data $R_{f_i}$, a straight line $Y_{\zeta_k}$ is constructed. An energy difference $E_{\zeta_k}$ is calculated between the straight line $Y_{\zeta_k}$ and the sample data $R_{\zeta_k}$. When the energy difference $E_{\zeta_k}$ between the straight line $Y_{\zeta_k}$ and the sample data $R_{\zeta_k}$ is small, it indicates that $\zeta_k$ is located at a pseudo boundary point of the rising edge, falling edge, or stable segment of the signal. On the contrary, $\zeta_k$ is retained as a valid segmentation point. To effectively quantify the magnitude of the difference, the energy difference $E_{\zeta_k}$ between the straight line $Y_{\zeta_k}$ and the sample data $R_{\zeta_k}$ is selected as the determination indicator.

Preferably, the energy difference is calculated by the formula $E_{\zeta_k}=|R_{\zeta_k}-Y_{\zeta_k}|_2^2$, where $|\bullet|_2$ represents a 2-norm of the vector.

S54: a parameter t is set, $\zeta_k$ is determined as the lower segment boundary point in a case that both the determination indicators $\Delta_{RE}$ and $\Delta_{LE}$ are less than t. $\zeta_k$ is directly discarded in a case that $\Delta_{RE} \geq t$. The determination indicator $E_{\zeta_k}$ requires to be determined in a case that $\Delta_{RE} < t$ and $\Delta_{LE} \geq t$, and $\zeta_k$ is determined as the lower segment boundary point in a case that $E_{\zeta_k} \geq 0.5$.

Preferably, the parameter t is an adjustable parameter, ranging from 0.1-0.3. In this example, t=0.15.

Figure 5:
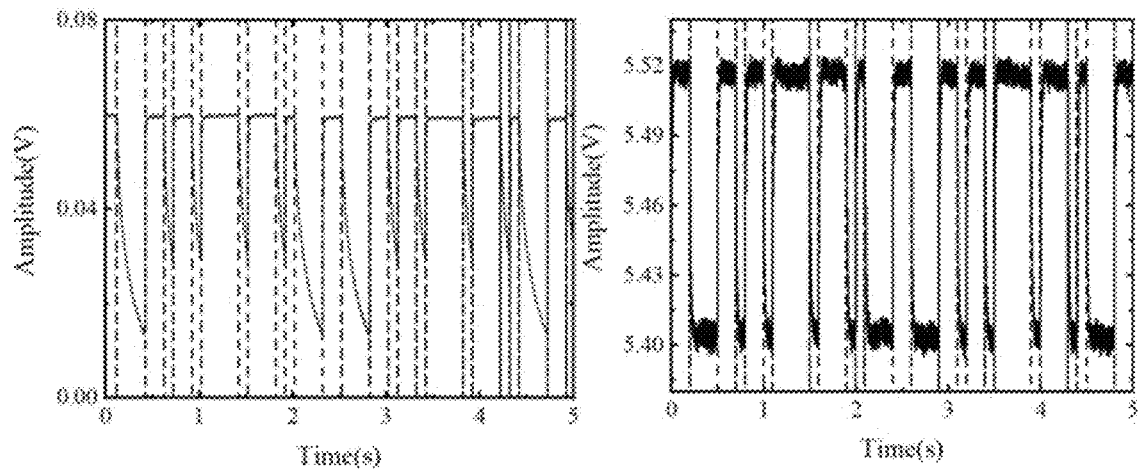
FIG. 5 is a schematic diagram showing the segmentation of the filtered signal after extracting upper and lower segment boundary points.

Preferably, after segmenting the filtered signal using the lower segment boundary point, the method of circle fitting circles by discrete points is employed to estimate the curvature vector of each signal segment. Finally, the horizontal coordinate corresponding to the maximum curvature is taken as the upper segment boundary point, and the upper and lower boundary segmentation points are utilized to achieve signal segmentation. The result is shown in FIG. 5. It can be seen that there is no missed detection or false detection, better achieving signal segmentation.

Figure 6:
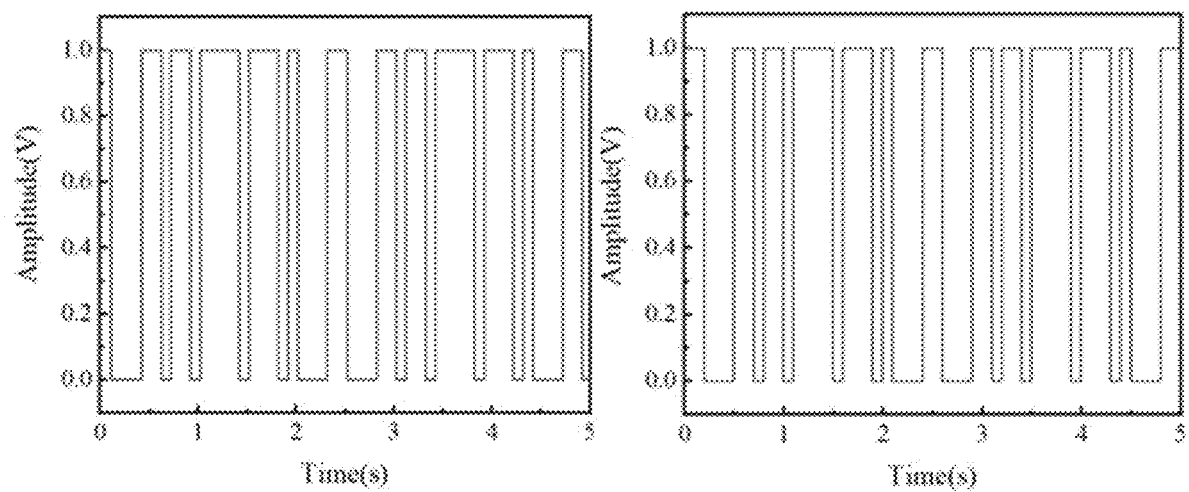
FIG. 6 is a schematic diagram showing the rectification of the filtered signal according to the upper and lower segment boundary points.

Preferably, the segmenting and rectifying the filtered signal includes that: the signal is rectified through the upper and lower segment boundary points; all filtered signal data from the lower segment boundary point to the first upper segment boundary point on the left are set as 0, and all the data from the lower segment boundary point to the first upper segment boundary point on the right are set as 1 according to the characteristics of the filtered signal, with each lower segment boundary point as a center, so that the automatic rectification of the filtered signal is completed. The signal is rectified by assigning high and low levels, the result is as shown in FIG. 6, indicating that signal segmentation can better improve the signal transmission rate and accuracy.

Finally, it is to be noted that the example described above is merely used to illustrate rather than limiting the technical solutions of the present disclosure. Although the present disclosure is described in detail by reference to the preferred example, it is to be understood by those ordinary skilled in the art that modifications or equivalent replacements can be made to the technical solutions of the present disclosure without departing from the principle and scope of the technical solutions of the present disclosure, and these modifications or equivalent replacements are included in the scope of claims of the present disclosure.

The invention claimed is:

1. A curvature-based signal segmentation method for solar-blind ultraviolet (UV) photodetectors, comprising steps performed by a processor:
    S1: instructing a solar-blind UV photodetector to collect solar-blind UV radiation according to a preset sampling time, and generate sampled signals from the solar-blind UV radiation;
    S2: instructing a fractional calculus digital filter to receive the sampled signals, and perform noise reduction on the sampled signals to generate filtered signals;
    S3: in a memory, calculating estimated curvatures of the filtered signals using a method of circle fitting by discrete points, and numerically optimizing the estimated curvatures using an exponential function to obtain curvature vectors of the filtered signals;
    S4: in the memory, weighting the filtered signals using a moving average filter function and a binarization method according to the curvature vectors of the filtered signals, to obtain a plurality of non-zero discrete time-domain segments; and excluding interference segments from each non-zero discrete time-domain segment based on a mean value and width thereof, to obtain candidate segmentation point signals; and
    S5: in the memory, setting determination indicators according to the candidate segmentation point signals to determine upper and lower segment boundary points, and segmenting and rectifying the filtered signals by means of the upper and lower segment boundary points to decode signals from solar-blind UV photodetectors.

2. The curvature-based signal segmentation method for solar-blind UV photodetectors according to claim 1, wherein step S3 comprises:
    S31: defining the filtered signal $S=\{S_0, S_1, \ldots, S_{n-1}\}$, where n is a length of the filtered signal, and framing the filtered signal according to a preset frame length w and a frame shift r to obtain $S=\{SW_0, SW_1, \ldots, SW_i, \ldots, SW_{(n-w-1)r}\}$, where $SW_i$ represents an $i_{th}$ frame signal of the filtered signal, and (n−w−1)r represents the number of frames in the filtered signal;
    S32: dividing, by means of a midpoint of the length $M=<w/2>$, the $i_{th}$ frame signal $SW_i=\{SW_{i1}, SW_{i2}, \ldots, SW_{i<w/2>}, \ldots, SW_{iw}\}$ of the filtered signal into left and right segmented frames $\{SW_{i1}, SW_{i2}, \ldots, SW_{i|<w/2>-1|}\}$ and $\{SW_{i|<w/2>+1|}, \ldots, SW_{iw}\}$, where < > represents rounding down; counting mid-values of signals of the left and right segmented frames, denoted as $S_{iR}$ and $S_{iL}$, respectively; and taking $(S_{iR}, M/2)=(x_1, y_1)$, $(S_{iM}, M)=(x_2, y_2)$, and $(S_{iL}, 3M/2)=(x_3, y_3)$ as three discrete points for the $i_{th}$ frame signal;

S33: constructing, based on a circle expansion formula $x_2+y_2+ax+by+c=0$, an error equation $W_{1i}=\Sigma_{j=1}^{3}(x_j^2+y_j^2+ax_j+by_j+c)^2$ for a circle of the $i_{th}$ frame signal and a position error equation $W_{2i}=E_{j=1}^{3}(y_j-(dx_j+e))^2$ for a straight line and a center of the circle using the three discrete points $(x_j, y_j)(j=1, 2, 3)$ of the $i_{th}$ frame signal of the filtered signal; and calculating partial derivatives 0 for the unknown parameters a, b, c, d, and e to obtain approximate estimated values $â_I$, $b̂_I$, $ĉ_I$, $d̂_I$, and $ê_I$ for this frame signal;

S34: constructing a fitting circle based on $â_I$, $b̂_I$, $ĉ_I$, $d̂_I$, and $ê_I$, and calculating an estimated curvature for the $i_{th}$ frame signal of the filtered signal:

$$\hat{\rho}_i = (-1)^{\tau_i} / [(\hat{a}_i^2 + \hat{b}_i^2 - 4\hat{c}_i^2)/2]^{1/2}$$

$$\tau_i = [\text{sign}(\hat{a}_i \hat{d}_i + \hat{e}_i - \hat{b}_i) + 1]/2$$

where $\hat{\rho}_I$ represents the estimated curvature for the $i_{th}$ frame signal of the filtered signal, $\tau_i$ is a parameter reflecting the bending direction of a curve of the $i_{th}$ frame signal, and sign(•) represents a sign function; and selecting a frame shift r=1, and obtaining an estimated curvature sequence $\rho=\{\rho_0, \rho_1, \ldots \rho_{n-1}\}$ of the filtered signal through periodic extension; and S35: extracting the maximum element Pmax from the estimated curvature sequence $\rho$ of the filtered signal, normalizing the estimated curvature of the filtered signal according to $\rho_{max}$, i.e., $\bar{\rho}_I=\rho_I/\rho_{max}$, and i= $\{0, 1, \ldots, n-1\}$; and using the normalized $\bar{\rho}_I$ as an input variable x for the exponential function $R(x)=10^x$ to obtain the numerically optimized curvature vector $R=\{R_0, R_1, \ldots, R_{n-1}\}$.

3. The curvature-based signal segmentation method for solar-blind UV photodetectors according to claim 1, wherein step S4 comprises:

S41: smoothing the curvature vector R using the moving average filter function, setting a threshold $\theta=A\times\max(R)$ to traverse each element in the smoothed result, and setting weights of elements greater than the threshold $\theta$ as 1 and weights of elements less than or equal to the threshold $\theta$ as 0, to generate a weight coefficient vector $\phi=[\phi_0, \phi_1, \ldots, \phi_{n-1}]$ corresponding to the smoothed result, A being an adjustable parameter;

S42: weighing the filtered signal according to the weight coefficient vector $\phi$, i.e., $Q=S\times\phi$, to obtain the plurality of non-zero discrete time-domain segments; and S43: extracting the mean value and width of each non-zero discrete time-domain segment sequentially, discarding the non-zero discrete time-domain segment if the mean value thereof is less than 30% of the threshold $\theta$ and the width is below 150, and otherwise, retaining the non-zero discrete time-domain segment, to obtain the candidate segmentation point signal.

4. The curvature-based signal segmentation method for solar-blind UV photodetectors according to claim 3, wherein A ranges from 0.1-0.3.

5. The curvature-based signal segmentation method for solar-blind UV photodetectors according to claim 1, wherein the setting determination indicators according to the candidate segmentation point signals to determine upper and lower segment boundary points comprises:

determining the lower segment boundary point according to the candidate segmentation point signal by setting the determination indicator, segmenting the filtered signal using the lower segment boundary point, estimating the curvature vector for each segment of signal using the method of circle fitting by discrete points, and finally taking a horizontal coordinate corresponding to the maximum curvature as the upper segment boundary point.

6. The curvature-based signal segmentation method for solar-blind UV photodetectors according to claim 5, wherein the determining the lower segment boundary point according to the candidate segmentation point signal by setting the determination indicator comprises:

S51: extracting horizontal coordinates corresponding to the maximum values in various non-zero discrete time-domain segments of the candidate segmentation point signal to form a one-dimensional vector $\zeta=\{\zeta_0, \zeta_1, \ldots \zeta_k, \ldots, \zeta_{K-1}\}$, where K represents the number of non-zero discrete time-domain segments in the candidate segmentation point signal, performing a first-order forward difference operation on the one-dimensional vector $\zeta=\{\zeta_0, \zeta_1, \ldots \zeta_k, \ldots, \zeta_{K-1}\}$, and calculating a mean value to obtain a neighborhood width $\gamma$ used for determination of segment boundary points;

S52: taking a horizontal coordinate $\zeta_k$ corresponding to the maximum value in each non-zero discrete time-domain segment as a center point, and intercepting sample data $R_{\zeta_k}=\{R_{\zeta_{k-<\lambda/2>}}, \ldots, R_{\zeta_k}, \ldots, R_{\zeta_{k+<\lambda/2>}}\}$ with a length $\gamma$ on left and right, and calculating determination indicators $\Delta_{RE}=N_{RE}/\lambda$ and $\Delta_{LE}=N_{LE}/\lambda$, where $N_{RE}$ and $N_{LE}$ represent the number of sample points less than $R_{\zeta_k}$ in the left and right data of $\zeta_k$; $\lambda=\gamma-1$;

S53: dividing $R_{\zeta_k}$ into two segmented data $\{R_{\zeta_{k-<\lambda/2>}}, \ldots, R_{\zeta_k}\}$ and $\{R_{\zeta_{k+1}}, \ldots, R_{\zeta_{k+<\lambda/2>}}\}$ with the sample data $R_{\zeta_k}$ as a center; counting mid-values $R_{\zeta_{kR}}$ and $R_{\zeta_{kL}}$ of the left and right segmented data, respectively, taking three points $(R_{\zeta_{kR}}, \zeta_{k-<\lambda/2>})$, $(R_{\zeta_k}, \zeta_k)$, and $(R_{\zeta_{kL}}, \zeta_{k+<\lambda/2>})$ as discrete points of the sample data $R_{\zeta_k}$ to construct a straight line $Y_{\zeta_k}$, and calculating an energy difference $E_{\zeta_k}$ between the straight line $Y_{\zeta_k}$ and the sample data $R_{\zeta_k}$; and S54: setting a parameter t, determining $\zeta_k$ as the lower segment boundary point in a case that both the determination indicators $\Delta_{RE}$ and $\Delta_{LE}$ are less than t, directly excluding $\zeta_k$ in a case that $\Delta_{RE}\geq t$; and requiring to determine the determination indicator $E_{\zeta_k}$ in a case that $\Delta_{RE}<t$ and $\Delta_{LE}\geq t$, and determining $\zeta_k$ as the lower segment boundary point in a case that $E_{\zeta_k}\geq 0.5$.

7. The curvature-based signal segmentation method for solar-blind UV photodetectors according to claim 6, wherein the energy difference is calculated by the formula $\Sigma\zeta_k=|R_{\zeta_k}-Y_{\zeta_k}|_2^2$, where $|\bullet|_2$ represents a 2-norm of the vector.

8. The curvature-based signal segmentation method for solar-blind UV photodetectors according to claim 6, wherein the parameter t is an adjustable parameter, ranging from 0.1-0.3.

9. The curvature-based signal segmentation method for solar-blind UV photodetectors according to claim 1, wherein the segmenting and rectifying the filtered signal comprises: rectifying the signal through the upper and lower segment boundary points; setting all filtered signal data from the lower segment boundary point to the first upper segment boundary point on the left as 0, and setting all the data from the lower segment boundary point to the first upper segment boundary point on the right as 1 according to the characteristics of the filtered signal, with each lower segment boundary point as a center; and completing the automatic rectification of the filtered signal.

* * * * *